(12) United States Patent
Thetford et al.

(10) Patent No.: US 11,578,211 B2
(45) Date of Patent: Feb. 14, 2023

(54) POLYMERIC DISPERSANTS CONTAINING ONE OR TWO QUATERNARY AMINE ANCHORING GROUPS WITH IMPROVED CHEMICAL AND THERMAL STABILITY

(71) Applicant: Lubrizol Advanced Materials, Inc., Cleveland, OH (US)

(72) Inventors: Dean Thetford, Rochdale (GB); Neil L. Simpson, Oldham (GB)

(73) Assignee: Lubrizol Advanced Materials, Inc., Cleveland, OH (US)

(*) Notice: Subject to any disclaimer, the term of this patent is extended or adjusted under 35 U.S.C. 154(b) by 855 days.

(21) Appl. No.: 16/480,693

(22) PCT Filed: Jan. 26, 2018

(86) PCT No.: PCT/US2018/015467
§ 371 (c)(1),
(2) Date: Jul. 25, 2019

(87) PCT Pub. No.: WO2018/140739
PCT Pub. Date: Aug. 2, 2018

(65) Prior Publication Data
US 2020/0002539 A1    Jan. 2, 2020

Related U.S. Application Data

(60) Provisional application No. 62/450,665, filed on Jan. 26, 2017.

(51) Int. Cl.
| | |
|---|---|
| C09B 67/46 | (2006.01) |
| C09D 7/65 | (2018.01) |
| C09D 7/45 | (2018.01) |
| C08K 3/013 | (2018.01) |
| C08G 18/32 | (2006.01) |
| C08G 18/42 | (2006.01) |
| C08G 18/50 | (2006.01) |
| C08G 18/73 | (2006.01) |
| C08G 18/75 | (2006.01) |
| C08G 18/76 | (2006.01) |
| C08G 63/685 | (2006.01) |
| C08G 63/91 | (2006.01) |
| C08G 77/12 | (2006.01) |
| C08L 67/08 | (2006.01) |
| C09D 5/02 | (2006.01) |

(52) U.S. Cl.
CPC ........ *C09B 67/009* (2013.01); *C08G 18/3228* (2013.01); *C08G 18/42* (2013.01); *C08G 18/5024* (2013.01); *C08G 18/73* (2013.01); *C08G 18/75* (2013.01); *C08G 18/76* (2013.01); *C08G 63/685* (2013.01); *C08G 63/912* (2013.01); *C08G 77/12* (2013.01); *C08K 3/013* (2018.01); *C08L 67/08* (2013.01); *C09D 5/027* (2013.01); *C09D 7/45* (2018.01); *C09D 7/65* (2018.01); *C08G 2150/00* (2013.01); *C08L 2203/20* (2013.01)

(58) Field of Classification Search
None
See application file for complete search history.

(56) References Cited

U.S. PATENT DOCUMENTS

| | | |
|---|---|---|
| 3,996,059 A | 12/1976 | Stansfield et al. |
| 2008/0227945 A1 | 9/2008 | Richards et al. |
| 2012/0316308 A1* | 12/2012 | Tamareselvy ......... C08F 220/34 526/312 |
| 2013/0261270 A1 | 10/2013 | Butikofer et al. |
| 2015/0368425 A1 | 12/2015 | Hughes et al. |

FOREIGN PATENT DOCUMENTS

| | | |
|---|---|---|
| GB | 1373660 A | 11/1974 |
| WO | 2006138269 A2 | 12/2006 |
| WO | 2012154515 A1 | 11/2012 |

* cited by examiner

*Primary Examiner* — Robert T Butcher
(74) *Attorney, Agent, or Firm* — Vincent Cortese; Samuel B. Laferty; Michael Miller

(57) ABSTRACT

The present invention relates to a dispersant having a tertiary or quaternary amine anchoring group and a solubilizing polymer selected from $C_{8-50}$ fatty acid; a $C_{8-50}$ ak(en)yl substituted succinic acid, anhydride or partial ester; a dimer or trimer fatty acid; and/or polymers from repeating units of polyesters, polyethers, polyacrylate, polyamides, polyurethanes or mixtures of said repeating units in a random or blocky copolymer. The dispersants are an improvement in that the alkylene connecting group between the tertiary or quaternized amine and the solubilizing polymer lacks abstractable hydrogen atoms at the geminal carbon atom from the nitrogen of the tertiary or quaternized amine over the prior art. The dispersants are useful as dispersants with improved thermal stability and low amounts yellow color after aging at elevated temperatures.

6 Claims, No Drawings

POLYMERIC DISPERSANTS CONTAINING ONE OR TWO QUATERNARY AMINE ANCHORING GROUPS WITH IMPROVED CHEMICAL AND THERMAL STABILITY

CROSS REFERENCE TO RELATED APPLICATION

This application is a national phase entry under 35 U.S.C. 371 of PCT/US2018/015467 filed Jan. 26, 2018, which claims the benefit of U.S. Provisional Application No. 62/450,665 filed Jan. 26, 2017.

FIELD OF INVENTION

The present invention relates to a dispersant made from a diamine or amino alcohol component having a tertiary amine group wherein the beta carbon atom from the nitrogen atom of said tertiary amine as one goes toward the hydroxyl or other amine (said other amine being a primary or secondary amine) group lacks abstractable hydrogen atoms, because the beta carbon atom is disubstituted with groups selected from alkyl (selected from methyl, ethyl, propyl) or hydroxyl alkyl groups. The dispersant comprising a hydrophobic alk(en)yl component with one or more carboxylic group or solubilizing polymer having repeating units selected from ether, ester, olefin, acrylate, or urethane repeating units, or copolymers of said named repeating. The dispersants are useful for dispersing pigments or fine particulate (generally less than 1 micrometer in diameter) in coatings, inks, plastics, rubber, etc.

BACKGROUND OF THE INVENTION

Many formulations such as inks, paints, mill-bases and plastics materials require effective dispersants for uniformly distributing a particulate solid in a non-polar organic medium.

Numerous publications disclose dispersants that comprise tertiary amine groups or quaternized amine groups. However, these amine groups historically are known to be subject to degradation reactions at elevated temperatures that reduce the effectiveness of the dispersant and/or generate yellow degradation products. US 2014/0114019 discloses dispersants from polyesters containing tertiary amines which are quaternized with a hydrocarbyl epoxide in combination with an acid.

SUMMARY OF THE INVENTION

One objective of the present invention is to provide a tertiary amine or quaternized tertiary amine based dispersant that when exposed to elevated temperatures has reduced degradation tendencies and/or produces less yellow degradation products.

According to the present invention there is provided a composition comprising a particulate solid, an organic or aqueous medium and a compound of Formula (1) and salts thereof:

$$(D)_m[-Z-A-R]_n \qquad \text{Formula 1}$$

wherein m=1-3 and n=1-2;

and more desirably when n is 1, m is 1-3, and more desirably when n is 2, m is 1; and wherein Z-A-R is not a polymeric repeat unit attached to itself.

D comprises a $C_{8-50}$ fatty acid; a $C_{8-50}$ alk(en)yl substituted succinic acid, anhydride or partial ester; a dimer or trimer fatty acid; and/or a linear, branched, block, random polymer and/or copolymer which contains one or two groups along the polymer backbone capable of forming a covalent bond (linkage) with a nitrogen atom of an amine or an oxygen atom of an alcohol group. D may comprise repeating units from polyester, polyether, polyamide, urethane, polyether, and polyolefin either as homopolymer or copolymer. The copolymer may be random or blocky. D should be selected to be compatible with the continuous phase of a selected aqueous or non-aqueous dispersion media.

As an alternative of D being derived from a pre-made polymer coupled during dispersant manufacture, D may be a polyether polymerized from the hydroxyl group of the amino alcohol or the primary or secondary amine of the diamine.

Z is O or N(T).

T is H, or a $C_{1-18}$ hydrocarbyl radical, or a group represented by A-R, or a second polymer D connected to the nitrogen atom (N) via a covalent linkage (i.e., opening an epoxide) or to the same polymer D by an acylating group forming a 5-membered cyclic imide ring system.

Z-A-R represents the residue of the coupling reaction product of an amino alcohol or a diamine (optionally a triamine) of the formula HZ-A-R with the reactive group of D (the amino alcohol or diamine (or triamine) being without the H of the alcohol or the H of the primary or secondary amine which is lost in the covalent coupling reaction with D). One or more amine group of the amino alcohol or amine compound of the formula H-Z-A-R is tertiary. Subsequently, (optionally) the tertiary amine group(s) can be quaternised. The alcohol functionality and coupling amine group in the diamine (can be primary or secondary) is attached via a covalent bond to the polymer D. The coupling reactions between D and Z can be a) Michael addition reaction of an activated carbon to carbon double bond of D to an amine precursor to Z, b) amide forming reaction of a carbonyl of D to a nitrogen atom of an primary or secondary amine, c) coupling reaction of an aldehyde or ketone carbon atom of D with an primary or secondary amine nitrogen, d) urea coupling reaction from an isocyanate group of D with an amine precursor group to Z, e) reaction of isocyanate group of D with alcohol to form urethane linkage, f) polymerization of ether repeating units from an amine precursor to Z, g) polymerization of ether repeating units from an oxygen of a hydroxyl precursor to Z, and h) ester forming reaction of an carbonyl group of the precursor of D with an oxygen atom of the alcohol precursor of Z.

D, prior to forming structure 1, can contain one or more acylating groups (typically carbonyl group from carboxylic acid, ester, or anhydride), epoxides, isocyanates, unsaturated carbonyl (Michael addition), keto (acetoacetyl) for reaction with the alcohol/amine functionality.

D can be a polymer comprising a polyester, polyether, polyamide, polyesteramide, polyacrylate, polyurethane, polyolefin repeating units and mixtures of said repeating units as random or blocky copolymers.

Z-A-R represents a residue of an amino alcohol or a diamine in which the functionalities are separated by a gem disubstituted alkylene radical of 5 carbons or more and wherein A can be represented by the formula

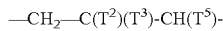

wherein we use the word residue of the coupling reaction of D and Z does not mean merely what is left; but rather means the normal reaction product from the amino alcohol or diamine reactant (also known as precursor to -Z-A-R) after reacting with the D group through the named chemical reactions (generally the precursor less a hydrogen atom);

$T^2$ and $T^3$ are each independently alkyl such as methyl, ethyl, propyl, hydroxyalkyl such as —$CH_2OT^4$, aryl such as Ph (phenyl) or the group —$CH(T^6)$-R;

$T^4$ is H, the polymer D or mixtures thereof;

$T^5$ and $T^6$ are each independently H or optionally $C_{1-4}$ alkyl, halo, $C_{1-4}$ alkyl ether substituted aryl such as Ph.

Examples of the radicals represented by A include 2,2-dimethylpropylene, 2-ethyl-2-methylpropylene, 2,2-diethylpropylene, 2-methyl-2-propylpropylene, 2-ethyl-2-hydroxymethylpropylene, 2-methyl-2-phenylpropylene.

The tertiary or quaternary ammonium group R, including salts thereof, is represented by the formula

—$N(R^2)(R^3)$ or

—$N^+(R^2)(R^3)(R^4)W^-$ wherein $R^2$, $R^3$ and $R^4$ are each independently linear or branched alkyl, aralkyl, or alkaryl groups (of 1 to 8, more desirably 1-4 carbon atoms); and $W^-$ is a colorless or colored anion.

Examples of the radicals represented by the tertiary amine include N,N-dimethylamino, N-methyl-N-phenylamino, N-benzyl-N-methylamino, N-methyl-o-toluidine, imidazole, pyridine, pyrrole.

The non-polar organic medium may, for instance, include a mineral oil, an aliphatic hydrocarbon, an aromatic hydrocarbon, a plastic material (typically a thermoplastic resin), or a plasticizer.

The present invention also provides a composition comprising a particulate solid (typically a pigment or filler), a non-polar organic medium and a dispersant compound of the invention described above.

In one embodiment, the invention provides a paint or ink comprising a particulate solid, a non-polar organic medium, a film-forming resin and a dispersant compound of the invention disclosed herein.

The ink may be an ink-jet ink, a gravure ink, or an offset ink (ink for color filters for flat screen devices).

In one embodiment, the invention provides a composition comprising a compound of the present invention, a particulate solid (typically a pigment or filler), and a polar or non-polar organic medium, wherein the organic medium may be a plastics material. The plastic material may be a thermoplastic resin.

In one embodiment, the invention provides for the use of the compound described herein as a dispersant in a composition disclosed herein.

In one embodiment, the invention provides a dispersant compound obtained/obtainable by reacting one or more amino alcohol or diamine having a tertiary amine with one or more polymer D having groups reactive with said alcohol or amine groups to form a covalent bond between the two reactants.

DETAILED DESCRIPTION OF THE INVENTION

According to the present invention there is provided a dispersant of Formula (1) and salts thereof:

$(D)_m[-Z-A-R]_n$      Formula 1 wherein m=1-3 and n=1-2;

and more desirably when n is 1, m is 1-3, and more desirably when n is 2, m is 1; and wherein Z-A-R is not a polymeric repeat unit attached to itself.

In another embodiment of the present invention there is provided a composition comprising a particulate solid, an organic or aqueous medium and a compound of Formula (1) and salts thereof:

$(D)_m[-Z-A-R]_n$      Formula 1 wherein m=1-3 and n=1-2;

and more desirably when n is 1, m is 1-3, and more desirably when n is 2, m is 1; and wherein Z-A-R is not a polymeric repeat unit attached to itself.

D comprises $C_{8-50}$ fatty acid; a $C_{8-50}$ alk(en)yl substituted succinic acid, anhydride or partial ester; a dimer or trimer fatty acid; a hydrocarbyl chain of $C_{8-500}$, or a polymer which may be linear, branched, random or block which contains one or more group capable of forming a covalent bond (linkage) with an amine or alcohol group.

Z is the —N(T)- or —O— linkage of a bridging group represented by the formula below which is attached via a covalent bond to an acylating group (typically carbonyl group) or to a residue of an epoxide or a residue of an isocyanate or a residue of an unsaturated carbon-to-carbon bond activated by a carbonyl on the group D through a nitrogen atom or an oxygen atom and the divalent linkage can be generally represented by the formula —N(T)-A- or —O-A- wherein T is H, or a $C_{1-18}$ hydrocarbyl radical, or a group represented by A-R, or a second polymer D connected to the nitrogen atom (N) via a covalent linkage (i.e., opening an epoxide) or to the same polymer D by an acylating group forming a 5-membered cyclic imide ring system.

A is a gem disubstituted alkylene radical (when counting from the right (where the R variable is located) to left (where the Z variable is located) in the formula) and can be represented by the formula

—$CH_2$—$C(T^2)(T^3)$-$CH(T^5)$- wherein the Z functionality is on the left and the tertiary or quaternized amine is on the right and $T^2$ and $T^3$ are each independently alkyl such as Me, Et, Pr, hydroxyalkyl such as —$CH_2OT^4$, aryl such as Ph or the group —$CH(T^6)$-R;

$T^4$ is H, D or mixtures thereof;

$T^5$ and $T^6$ are each independently H or optionally $C_{1-4}$ alkyl, halo, $C_{1-4}$ alkyl ether substituted aryl such as Ph; and R is a tertiary amine group including salts thereof represented by the formula

—$N(R^2)(R^3)$ or a quaternary ammonium group represented by the formula

—$N^+(R^2)(R^3)(R^4)W^-$ or mixtures thereof, wherein $R^2$, $R^3$ and $R^4$ are each independently a linear or branched alkyl, aryl or alkaryl groups (of 1 to 8, more desirably 1-4 carbon atoms); and $W^-$ is a colorless or colored anion.

The acids used to form salts with the amino groups or which contain the anion $W^-$ can be any inorganic acid or colorless or colored organic acid, such as hydrochloric acid, sulphuric acid, acetic acid, propionic acid, formic acid, methane sulphonic acid, benzene sulphonic acid, benzoic acid or an organic dyestuff containing at least one sulphonic acid or carboxylic acid group, in particular azo, anthraquinone or phthalocyanine dyestuffs containing at least one sulphonic or carboxylic acid group such as are described in for example the third edition of the Color Index which was published in 1971.

Examples of suitable gem disubstituted amines represented by HZ-A-R include 3-dimethylamino-2,2-dimethylpropan-1-ol, N,N,2,2-tetramethyl-1,3-diaminopropane and mixtures thereof. Examples of the radicals represented by A include 2,2-dimethylpropylene, 2-ethyl-2-methylpropylene, 2,2-diethylpropylene, 2-methyl-2-propylpropylene, 2-ethyl-2-hydroxymethylpropylene, 2-methyl-2-phenylpropylene.

Examples of the radicals represented by R include dimethylamino, diethylamino, benzyl methylamino, dibenzylamino, imidazole, pyridine.

Examples of the radicals represented by $R^2$, $R^3$, and $R^4$ include alkyl such as methyl, ethyl, n-propyl, n-butyl, hexyl, octyl and octadecyl, hydroxy lower alkyl such as 2-hydroxyethyl, benzyl and cyclohexyl, 2-hydroxypropyl, 2-hydroxy-3-phenoxypropyl and 2-hydroxy-2-phenylethyl.

The quaternary ammonium group can be prepared by reaction of the tertiary amine with a quaternizing agent optionally in the presence of an acid such as acetic acid, propionic acid.

Examples of quaternizing agents include dimethyl sulfate, diethyl sulfate, benzyl chloride, ethylene oxide, propylene oxide, butylene oxide, isobutylene oxide, methyl p-toluene sulfonate, phenyl glycidyl ether and styrene oxide. The extent of quaternization can be from 0 to 100 mole %, more desirably from about 20 to about 80 or 90 mole %, and preferably from about 50 to about 80 or 90 mole %. US 2014/0114019 discloses dispersants from polyesters containing tertiary amines which are quaternized with a hydrocarbyl epoxide in combination with an acid.

Some percentage of the tertiary amines may not be quaternized. Optionally, some of the tertiary amines may react with an acid and form a salt. Appropriate acids to form salts with tertiary amines are well known to the art. It is sometimes desirable to use acids that are fairly volatile as they can be volatilized from the dispersant allowing the tertiary amine to revert back to its original condition.

The terms "hydrocarbyl" or "hydrocarbylene" denotes a group having a carbon atom directly attached to the remainder of the molecule and having a hydrocarbon or predominantly hydrocarbon character within the context of this invention. Such groups include purely hydrocarbon groups; that is, aliphatic, and optionally groups containing non-hydrocarbon substituents (hetero atoms) which do not alter the predominantly hydrocarbon character of the group. Examples include hydroxy, nitro, cyano, alkoxy, acyl groups, etc. Suitable hetero atoms will be apparent to those skilled in the art and include, for example, nitrogen, oxygen and sulphur.

Polymer(s) D are typically based on the residue of polyether, polyester, poly(meth)acrylate, polyurethane, polyolefin, polyester, polyamide or mixtures thereof or copolymers of polyether and polyurethane, polyester/polyether.

The compound of Formula (1) may be obtained/obtainable from a beta gem disubstituted alkyl amine containing an alcohol or amine group capable of reacting with a hydrocarbyl substituted acylating agent. The acylating agent may have one or more acid functional groups such as carboxylic acid or anhydride thereof.

When n=1 and Z and R are as indicated above, the compound of Formula (1) may be obtained/obtainable from a beta gem disubstituted amine containing an alcohol or amine group reacting with an acylating group from D.

In one embodiment, D is obtained/obtainable from a hydrocarbyl acylating agent and can be represented by:—

1) a hydrophobic alk(en)yl chain, or hydrocarbyl group with a carbon chain length of 8-50 typically based on $C_{8-50}$ fatty acids such as 2-ethylhexanoic acid, decanoic acid, lauric acid, palmitic acid, oleic acid, linoleic acid, stearic acid, arachidic acid, behenic acid, lignoceric acid, mixtures of fatty acids derived from oils from naturally occurring sources such as sunflower oil, rape seed oil, castor oil, olive oil, etc., branched alkyl carboxylic acids available under the trademark Isocarb™ (ex Sasol) and Unicid™ acids which are linear $C_{25-50}$ synthetic primary acids commercially available from Baker Petrolite;

2) a $C_{8-500}$ alkenyl substituted succinic acid, anhydride or partial esters thereof typically based on succinic anhydrides such as octadecyl succinic anhydride, dodecyl succinic anhydride, dodecenyl succinic anhydride, octadecylsuccinic anhydride and Polyisobutylsuccinic anhydrides (PIBSA) with average MW (molecular weight) of 300 to 5000, 450 to 4000, 500 to 3000 or 550 to 2500, particular ranges for average MW may include 550 to 1000 or 1600 to 2300;

3) dimer or trimer fatty acids. The terms dimer fatty acids (also referred to as dimer diacids or dimer fatty diacid) and trimer fatty acids are well known in the art, and refers to the dimerisation or timerization products of mono- or polyunsaturated fatty acids and/or esters thereof. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids.

The dimer and trimer fatty acids used in the present invention are preferably derived from the dimerisation products of $C_{10}$ to $C_{30}$ fatty acids, more preferably $C_{12}$ to $C_{24}$ fatty acids, particularly $C_{14}$ to $C_{22}$ fatty acids, further preferably $C_{16}$ to $C_{20}$ fatty acids, and especially $C_{18}$ fatty acids. Thus, the resulting dimer fatty acids preferably comprise in the range from 20 to 60, more preferably 24 to 48, particularly 28 to 44, further preferably 32 to 42, and especially 36 carbon atoms. Preferably, the fatty acids used are linear monounsaturated fatty acids.

The molecular weight (weight average) of the dimer fatty acid is preferably in the range from 450 to 690, more preferably 500 to 640, particularly 530 to 610, and especially 550 to 590 g/mole. The molecular weight (weight average) of the trimer fatty acids is preferably in the range from 750 to 950, more preferably 790 to 910, particularly 810 to 890, and especially 830 to 870. In addition to the dimer fatty acids, dimerisation usually results in varying amounts of trimer fatty acids (so-called "trimer"), oligomeric fatty acids, and residues of monomeric fatty acids (so-called "monomer"), or esters thereof, being present. They are available from Croda under the Pripol™ trademark or Arizona Chemical under the Unidyme™ trademark.

The dimer fatty acid used in the present invention preferably may have a dimer fatty acid (or dimer) content of greater than 60 wt. %, more preferably greater than 70 wt. %, particularly greater than 80 wt. %, and especially greater than 85 wt. %. In addition, particularly preferred dimer fatty acids may have a trimer fatty acid (or trimer) content of less than 40 wt. %, more preferably less than 30 wt. %, particularly less than 20 wt. %, and especially less than 15 wt. %. Furthermore, the dimer and or trimer fatty acid preferably comprises less than 10 wt. %, more preferably less than 6 wt. %, particularly less than 4 wt. %, and especially less than 3.5 wt. % of mono fatty monoacid (or monomer). All of the above weight percentage values are based on the total weight of polymerised fatty acids and mono fatty acids present.

D can further comprise a polyester chain containing an acylating group with a MW range of 300-5000 and is obtained/obtainable from a hydroxy-substituted $C_{2-30}$ alkylene carboxylic acid, a hydroxy-substituted $C_{4-30}$ alkenylene carboxylic acid, lactones or mixtures thereof. Specific examples of suitable hydroxy carboxylic acids are ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, glycolic acid and lactic acid. The lactones from which D is obtained/obtainable is preferably optionally substituted ε-caprolactone, optionally substituted δ-valerolactone, β-propiolactone or γ-butyrolactone.

D can further comprise a polyester chain containing an acylating group with a MW range of 300-5000 and is obtained/obtainable from the reaction of a diol represented by the Formula (2) with a dibasic acid represented by the Formula (3)

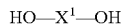  HO—X¹—OH  Formula 2

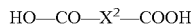  HO—CO—X²—COOH  Formula 3 wherein

X¹ is a linear or branched alkylene group containing from 2 to 20 carbon atoms or a polyalkylene glycol residue with the two hydroxyl groups removed; and X² is a linear or branched optionally cyclic alk(en)ylene group having 2 to 20 carbon atoms or Ph.

Specific examples of suitable diols include alkylene glycols such as ethylene glycol, propylene glycol, neopentyl glycol, 1,4-butanediol, 1,6-hexanediol, diols with ether linkages such as diethylene glycol, dipropylene glycol, tripropylene glycol and triethylene glycol. Examples of suitable polyalkylene glycols include polyethylene glycols, polypropylene glycols, polybutylene glycols, mixed block and random copolymers of polyethylene glycol and polypropylene glycol (Pluronic™ and reverse Pluronic™ ex BASF) with MW less than 1000. Specific examples of the dibasic acids and anhydrides include maleic anhydride, succinic anhydride, fumaric acid, malonic acid, adipic acid, sebacic acid, phthalic anhydride, and cyclohexane dicarboxylic anhydride.

D can further comprise a polyamide chain containing an acylating group with a MW range of 300-5000 and is obtained/obtainable from the reaction of a diamine represented by the Formula (4) with a dibasic acid represented by the Formula (3)

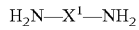  H₂N—X¹—NH₂  Formula 4 wherein

X¹ is a linear or branched alkylene group containing from 2 to 20 carbon atoms or a polyalkylene glycol residue with the two amino groups removed; or the polyamide is obtained/obtainable from the reaction of a lactam, an aminocarboxylic acid or a mixture thereof.

Specific examples of diamines include alkylene diamines such as ethylenediamine, 1,2-propylenediamine, 1,3-propylene diamine, the isomeric butylenediamines, pentanediamines, hexanediamines, heptanediamines, 1,12-diaminododecane and diaminocyclohexanes, diamines with ether linkages such as 1,2-bis(2-aminoethoxy)ethane. Examples of suitable polyetherdiamines include Jeffamine™ diamines commercially available from Huntsman such as D230, D400, ED600. Specific examples of lactams include laurolactam and caprolactam and the aminocarboxylic acid may be glycine, sarcosine, beta-alanine, 4-aminobutyric acid, 6-aminocaproic acid, 11-aminoundecanoic acid or 12-aminododecanoic acid.

D can further comprise a co-condensate of ester and amide polymer chain (polyesteramide) containing an acylating group with a MW range of 300-5000 and is obtained/obtainable from the reaction of one or more compounds selected from the group of diols, dibasic acids/anhydrides, lactones and hydroxycarboxylic acids to prepare the polyester portion and one or more compounds from the group of diamines, aminocarboxylic acids, lactams and dibasic acids/anhydrides to prepare the polyamide portion.

For reaction conditions and process steps for formation of polyester using diols, polyesteramide and polyamides, please see U.S. Pat. No. 5,760,257, columns 5-7.

Typically, the D group of Formula (1) may have a hydroxyl group at the chain end in the case where D is a polyester or a polyesteramide or it may have an amino group at the chain end in the case where D is a polyamide or a polyesteramide and so it may be capped by $C_{1-50}$ carboxylic acids such as oleic, palmitic, stearic, erucic, lauric, 2-ethylhexanoic, 9,11- and 9,12-linoleic, 9,12,15-linolenic acids, abietic acid, methoxyacetic or caproic acid. Other examples from list above in fatty acid section.

Typically, the D group of Formula (1) may have a carboxylic acid group at the chain end in the case where D is a polyester, polyesteramide or polyamide and so it may be capped by $C_{1-50}$ alcohols such as methanol, ethanol, propanol, butanol, pentanol, hexanol, heptanol, octanol, 2-octanol, 2-butoxyethanol, decanol, dodecanol, tetradecanol, hexadecanol, octadecanol, eicosanol, isopropanol, isobutanol, tertbutanol, 2-ethylbutanol, 2-ethylhexanol, 3-heptanol, 3,5,5-trimethylhexanol, 3,7-dimethyloctanol and the so-called Guerbet alcohols such as those which are commercially available under the trade name Isofol (ex Sasol), or mixtures thereof. Specific examples of Guerbet alcohols are Isofol 12, 14T, 16, 18T, 18E, 20, 24, 28, 32, 32T and 36; or $C_{1-20}$ amines.

D can further comprise a polyether chain with a MW range of 200-5000 and the compound of Formula 1 where D is a polyether chain is obtained/obtainable from the reaction of the amino alcohol or diamine Z—R with alkylene oxides such as ethylene oxide, propylene oxide, butylene oxide, styrene oxide or mixtures thereof. Where the diamine Z—R has a primary amine, there may be two polymer chains of D covalently attached to the nitrogen atom.

D can further comprise a block polyester/polyether chain with a MW range of 300-5000 and the compound of Formula 1 where D is a block polyester/polyether chain can be obtained/obtainable from the reaction of the amino alcohol or diamine Z-A-R firstly with alkylene oxides such as ethylene oxide, propylene oxide, butylene oxide, styrene oxide or mixtures thereof and then subsequently with hydroxycarboxylic acids, lactones or mixtures thereof U.S. Pat. No. 5,914,072 to Zirstein provides process conditions for forming polyesters as described above. Where the diamine Z-A-R has a primary amine, there may be two polymer chains of D covalently attached to the nitrogen atom.

D can further comprise a polyurethane chain with a MW range of 300-5000 and is obtained/obtainable from the reaction of a diol represented by the Formula (2) or a dibasic acid represented by the Formula (3) or a diamine represented by the Formula (4) with a diisocyanate represented by the Formula 5

HO—X¹—OH             Formula 2

HO—CO—X²—COOH         Formula 3

H₂N—X¹—NH₂            Formula 4

OCN—X³—NCO Formula 5 wherein
X¹ and X² are as listed above; and
X³ is aliphatic, cycloaliphatic and aromatic.

Capping groups for Polymer D where hydroxyl, or amino present at chain end are carboxylic acids or derivatives such as esters.

Capping groups for Polymer D where acid or isocyanate present at chain end are monohydric alcohols and amines.

D can further comprise a polyacrylate or poly(styrene co acrylate) chain prepared by converting the amino alcohol Z—R into an initiator for two types of acrylic polymerisation. These are Atom Transfer Radical Polymerisation (ATRP) and Reversible Addition Fragmentation Chain Transfer polymerisation (RAFT). Both techniques differ from conventional free radical polymerisation in that they are "Living" i.e., no termination events resulting in dead chain ends. This means that homo or block copolymers of controlled molecular weight and polydispersity can be synthesised. Both techniques are very versatile (tolerant of many monomers) but have commercial drawbacks. ATRP uses a halide initiator and a copper catalyst which may need removal after polymerisation. RAFT is used in conjunction with conventional radical initiators but also thiols (smell). The same chemistry can be applied to any of the polymers D which have a terminal hydroxyl end to make a polyacrylate co-polyether or polyacrylate co-polyester or polyacrylate co-polyester co-polyether polymer by ATRP or RAFT.

The polyester may be a homopolymer or a copolymer. The copolymer may be either a random or block copolymer.

In one embodiment, the compound of the invention may be obtained/obtainable by reacting an amino alcohol or diamine with the structure H—Z—CH₂—C(T²)(T³)—CH(T⁵)-R with a polyolefin-substituted succinic anhydride, or mixtures thereof.

The polyolefin-substituted succinic anhydride may be a polyisobutylene succinic anhydride. The polyisobutylene from which the polyisobutylene succinic anhydride is derivable may have a number average molecular weight of 300 to 5000, 450 to 4000, 500 to 3000 or 550 to 2500. Particular ranges of the number average molecular weight may include 550 to 1000, or 750 to 1000, or 950 to 1000, or 1600 to about 2300.

The polyolefin may have a vinylidene group. The vinylidene group may be present on at least 2 wt. %, or at least 40%, or at least 50%, or at least 60%, or at least 70% of the polyolefin molecules. Often, the amount of vinylidene group present is about 75%, about 80% or about 85%.

When the polyolefin is a polyisobutylene the polyolefin may be obtained commercially under the tradenames of Glissopal®1000 or Glissopal®2300 (commercially available from BASF), TPC 555, TPC 575 or TPC 595 (commercially available from Texas Petrochemicals).

The polyolefin-substituted succinic anhydride may be obtained by reacting a polyolefin (typically polyisobutylene) with maleic anhydride by Diels Alder or by an "ene" reaction. Both reactions are known in the art. In one embodiment, the polyolefin-substituted succinic anhydride may be obtained by reacting a polyolefin (typically polyisobutylene) with maleic anhydride by an "ene" reaction.

The compound of the invention may be prepared by reacting a polymer D, having one or more (desirably 1 to 3) groups reactive with the oxygen of a hydroxyl group or the nitrogen of a primary or secondary amine to form a covalent bond, with an amino alcohol or diamine of the structure of the formula

H—Z—CH₂—C(T²)(T³)-CH(T⁵)-R wherein
Z is —O— or —N(T)-;
T is H, or a C₁₋₁₈ hydrocarbyl radical, or a group represented by A-R, or a second polymer D connected to the nitrogen atom (N) via a covalent linkage (i.e., opening an epoxide) or to the same polymer D by an acylating group forming a 5-membered cyclic imide ring system;

A can be represented by the formula

—CH₂—C(T²)(T³)-CH(T⁵)- wherein
T² and T³ are each independently alkyl such as methyl, ethyl, propyl, hydroxyalkyl such as —CH₂OT⁴, aryl such as Ph (phenyl) or the group —CH(T⁶)-R;
T⁴ is H, the polymer D or mixtures thereof;
T⁵ and T⁶ are each independently H or optionally C₁₋₄ alkyl, halo, C₁₋₄ alkyl ether, or substituted aryl such as Ph; and R is a tertiary amine including salts thereof of the formula —N(R²) (R³) or a quaternary ammonium group represented by the formula

—N⁺(R²)(R³)(R⁴)W⁻ or mixtures thereof, wherein
R², R³ and R⁴ are each independently a linear or branched alkyl, aryl or alkaryl groups; and
W⁻ is a colorless or colored anion at a reaction temperature in the range of 80° C. to 220° C., or 100° C. to 200° C.

The reaction of the amino alcohol or diamine HZ-A-R with polymer D may be carried out in an inert atmosphere, for example, under nitrogen or argon, typically nitrogen. The reaction temperature will vary depending on the type of reactive group on D. A catalyst may be used to facilitate the reaction occurring more quickly or at a lower temperature. If the reaction is one that produces water as a byproduct, the reaction can be pushed towards completion by removing the byproduct water. If it is desired to form a cyclic 5-membered imide ring between D and HZ-A-R, a higher temperature and/or removal of water byproducts may be desirable.

The reaction may be a one-step process or a two-step process. It is possible for the T group to comprise another D polymer. It is also possible for the A group to comprise another D polymer as a component within the variable T² or T³. This facilitates the variable m in Formula 1 being from 1 to 3.

INDUSTRIAL APPLICATION

In one embodiment, the compound of the invention disclosed herein may be a dispersant, typically used for dispersing particulate solid materials.

The compound of the invention disclosed herein in different embodiments may be present in the composition of the invention in a range selected from 0.1 to 50 wt. %, or 0.25 to 35 wt. %, and 0.5 to 30 wt. % based on the combined weight of dispersion of particulate with the dispersant in a continuous media.

The particulate solid present in the composition may be any inorganic or organic solid material which is substantially insoluble in the continuous media, either aqueous media, non-polar organic medium, or polar organic media at the temperature concerned and which it is desired to stabilize in a finely divided form therein. The particulate solids may be in the form of a granular material, a fiber, a platelet or in the form of a powder, often a blown powder. In one embodiment, the particulate solid is a pigment and/or a filler. The pigment may be an organic or inorganic pigment, typically an organic pigment.

Generally, if the particulate is a pigment or filler to be used in a coating or ink, it will be 10 micrometers in diameter or less and more preferably 1 micrometer in diameter or less. The diameters given are based on number average particle sizes based on dynamic light scattering measurements such as the Malvern brand of dynamic light scattering equipment. Low particles sizes are desired in coatings or inks as larger particles tend to gradually settle to the bottom of the container, if the density of the particulate is higher than the density of the continuous medium. If the particulate is a pigment or filler used in plastic or rubber, the particle size can be a little larger such as 100 micrometer in diameter or less and more preferably 10 micrometers in diameter or less. In rubber or plastic mediums, the particle size can be bigger because the amount of settling of large particles is minimized due to the generally higher viscosity of the continuous phase.

Examples of suitable particulate solids include pigments for solvent inks; pigments, extenders, fillers, blowing agents and flame retardants for paints and plastics materials; dyes, especially disperse dyes; optical brightening agents and textile auxiliaries for solvent dyebaths, inks and other solvent application systems; solids for oil-based and inverse-emulsion drilling muds; metals; particulate ceramic materials and magnetic materials for ceramics, piezoceramic printing, refractories, abrasives, foundry, capacitors, fuel cells, ferrofluids, conductive inks, magnetic recording media, water treatment and hydrocarbon soil remediation; organic and inorganic nanodisperse solids, such as metal, metal oxides and carbon for electrodes in batteries; fibers such as carbon and boron for composite materials; and biocides, agrochemicals and pharmaceuticals which are applied as dispersions in organic media.

In one embodiment, the particulate solid may be an organic pigment from any of the recognised classes of pigments described, for example, in the Third Edition of the Color Index (1971) and subsequent revisions of, and supplements thereto, under the chapter headed "Pigments." Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties.

In one embodiment, the organic pigments are phthalocyanines, especially copper phthalocyanines, monoazos, disazos, indanthrones, anthranthrones, quinacridones, diketopyrrolopyrroles, perylenes and carbon black including single- and multi-walled carbon nanotubes, reinforcing and non-reinforcing carbon black, graphite, Buckminster fullerenes, asphaltene, and graphene.

In one embodiment, the solid particulate is not carbon black, or has less than 80, 50 or 10 wt. % carbon and metal wear byproducts as a component of the particulate solid, based on the total weight of the solid particulate.

Other useful particulate solids include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in Tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

The continuous media, in one embodiment a non-polar organic medium may be a plastics material and in another embodiment an organic liquid.

In one embodiment, the media can be a non-polar organic liquid comprising compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the media comprising a non-polar organic medium/liquid includes at least 0.1% by weight, or 1% by weight or more of a polar organic liquid based on the total organic liquid, with the proviso that the composition remains substantially non-polar. The non-polar medium may contain up to 5 wt. % or up to 10 wt. % of a polar organic liquid. Typically, the non-polar organic medium is substantially free of, to free of a polar organic liquid. In one embodiment, the non-polar medium is substantially free of, to free of water.

Examples of suitable polar organic liquids include amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

In one embodiment, polar organic liquids include dialkyl ketones, alkyl esters of alkane carboxylic acids and alkanols, especially such liquids containing up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of organic liquids, which may be used as polar organic liquids are film-forming resins. Examples of such film-forming resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of resins include short oil alkyd/melamine-formaldehyde, polyester/melamine-formaldehyde, thermosetting acrylic/melamine-formaldehyde, long oil alkyd, polyether polyols and multi-media resins, such as acrylic and urea/aldehyde.

The organic liquid may be a polyol, that is to say, an organic liquid with two or more hydroxy groups. In one embodiment, polyols include alpha-omega diols or alpha-omega diol ethoxylates.

If desired, the compositions containing a non-polar organic medium may contain other ingredients, for example, resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, levelling agents, gloss modifiers, biocides and preservatives.

The plastics material may be a thermosetting resin or a thermoplastic resin. The thermosetting resins useful in this invention include resins which undergo a chemical reaction when heated, catalysed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

The plastics material such as a thermoset resin may be useful for parts in boat hulls, baths, shower trays, seats, conduits and bulkheads for trains, trams, ships aircraft, body panels for automotive vehicles and truck beds.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods. Examples of a suitable thermoplastic include (low density, or linear low density or high density) polyethylene, polypropylene, polystyrene, polyethylene terephthalate (PET), polybutylene terephthalate (PBT), nylon 6, nylon 6/6, nylon 4/6, nylon 6/12, nylon 11 and nylon 12, polymethylmethacrylate, polyethersulphone, polysulphones, polycarbonate, polyvinyl chloride (PVC), thermoplastic polyurethane, ethylene vinyl acetate (EVA), Victrex PEEK™ polymers (such as oxy-1, 4-phenylenoeoxy-1, 4-phenylenecarbonyl-1, 4-phenylene polymers) and acrylonitrile butadiene styrene polymers (ABS); and various other polymeric blends or alloys.

If desired, the compositions containing plastic material may contain other ingredients, for example, dispersants other than the compound of the present invention, antifogging agents, nucleators, blowing agents, flame retardants, process aids, surfactants, plasticisers, heat stabilizers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling, high shear mixing or plastic milling until the dispersion is formed. Alternatively, the solid may be treated to reduce its particle size independently or in admixture with either, the organic medium or the dispersant, the other ingredient or ingredients then being added and the mixture being agitated to provide the composition.

In one embodiment, the composition of the present invention is suited to liquid dispersions. In one embodiment, such dispersion compositions comprise: (a) 0.5 to 40 parts of a particulate solid, (b) 0.5 to 30 parts of a dispersant composition as disclosed herein above, and (c) 30 to 99 parts of an organic medium; wherein all parts are by weight and the amounts (a)+(b)+(c)=100.

In one embodiment, component a) includes 0.5 to 40 parts of a pigment and such dispersions are useful as mill-bases, coatings, paints, toners, or inks.

If a composition is required including a particulate solid and a composition as disclosed herein above in dry form, the organic liquid is typically volatile so that it may be readily removed from the particulate solid by a simple separation means such as evaporation. In one embodiment, the composition includes the organic liquid.

If the dry composition consists essentially of the dispersant composition as disclosed herein above and the particulate solid, it typically contains at least 0.2%, at least 0.5% or at least 1.0% the composition as disclosed herein above based on weight of the particulate solid. In one embodiment, the dry composition contains not greater than 100%, not greater than 50%, not greater than 20%, or not greater than 10% by weight of the dispersant composition as disclosed herein above based on the weight of the particulate solid. In one embodiment, the composition, as disclosed herein above, is present at 0.6 wt. % to 8 wt. %.

As disclosed hereinbefore, the compositions of the invention are suitable for preparing mill-bases wherein the particulate solid is milled in an organic liquid or aqueous media in the presence of a dispersant composition, as disclosed herein above, or salts thereof.

Thus, according to a still further embodiment of the invention, there is provided a mill-base including a particulate solid, an organic liquid or aqueous media and a dispersant composition as disclosed herein above, or salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling. The binder is a polymeric material capable of binding the composition on volatilisation of the organic or aqueous liquid.

Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid, but is typically from 0.5 to 5% by weight of the mill-base. Continuous/liquid phase includes all of the liquid materials (e.g., solvent (optionally including water), liquid binder, dispersants, etc.) and any solid material that dissolves in the liquid materials after a short mixing period, e.g., it specifically excludes solid particulates that are dispersed in the continuous liquid phase.

Dispersions and mill-bases made from the composition of the invention are particularly suitable for use in aqueous, non-aqueous and solvent free formulations in which energy curable systems (ultra-violet, laser light, infra-red, cationic, electron beam, microwave) are employed with monomers, oligomers, etc., or a combination present in the formulation. They are particularly suitable for use in coatings such as paints, varnishes, inks, other coating materials and plastics.

Suitable examples include their use in low, medium and high solids paints, general industrial paints including baking, 2 component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as ink jet inks, inks for ink jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners, plastics materials and electronic materials, such as coating formulations for color filter systems in displays including OLED devices, liquid crystal displays and electrophoretic displays, glass coatings including optical fiber coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions.

The following examples provide illustrations of the invention. These examples are non-exhaustive and are not intended to limit the scope of the invention.

EXAMPLES

Intermediate 1 is Poly 12-hydroxystearic acid with an acid value of 36 mg KOH/g prepared as in Example A of U.S. Pat. No. 3,778,287.

Intermediate 2 is Poly 12-hydroxystearic acid with an acid value of 78.5 mg KOH/g prepared as in Example B of U.S. Pat. No. 3,778,287.

Intermediate 3 is Poly ricinoleic acid with an acid value of 37 mg KOH/g prepared as in Example C of U.S. Pat. No. 3,778,287.

Intermediate 4 is Poly ricinoleic acid with an acid value of 71 mg KOH/g prepared as in Example C of U.S. Pat. No. 3,778,287.

Example 1

PIBSA-DA molecular weight 1000 g/mol, 1409 parts heated up to 90° C. with stirring in a 2.5-liter flask under nitrogen atmosphere. Then, 3-dimethylamino-2,2'-dimethyl-propanol (DMADMPOL available from TCI (Japan, US) (191.9 parts)) was added dropwise over 2 hours. The reaction mixture was stirred at 90° C. for two hours. The IR showed an ester peak at 1736 $cm^{-1}$ and a carboxylate salt peak at 1581 $cm^{-1}$. And that gave a viscous golden liquid in the amount of 1584 parts.

Example 2

The product of Example 1 (35.17 parts by wt.) was stirred with dimethylsulphate (3 parts) at 95° C. for 4 hrs under a nitrogen atmosphere to give an amber viscous liquid (38 parts).

Example 3

Intermediate 1 (1218 parts) and DMADMPOL (51.27 parts) were stirred together at 110° C. under a nitrogen sparge in a 2 liter round bottomed flask fitted with a Dean and Stark condenser and thermometer. Zirconium butylate (6 parts) was added and the mixture was stirred at 145-150° C. for 40 hours to give a golden liquid (1230 parts) with an acid value of 17.1 mg KOH/g and a base equivalent of 3321.

Example 4

The product of Example 3 (500.7 parts) was stirred with dimethylsulphate (17.12 parts) at 95° C. for 8 hrs under a nitrogen atmosphere to give a brown viscous liquid.

Example 5

A pressure vessel is charged with DMADMPOL (95.24 parts) and potassium hydroxide (1.0 part). The vessel is pressurised with nitrogen to 10 psi and the contents are heated, with stirring, to 155° C. Ethylene oxide (319.72 parts) was added over 4 hours and the mixture was allowed to react over 5 hours until the pressure was stable at 15 psi. The product was isolated as a golden yellow liquid (426 parts).

Example 6

A pressure vessel was charged with the product from Example 5 (99.9 parts) and potassium hydroxide (0.8 part). The vessel was pressurised with nitrogen to 10 psi and the contents are heated, with stirring, to 120° C. Propylene oxide (202.98 parts) was added over 3 hours and the mixture was allowed to react over 6 hours until the pressure was stable at 14 psi. The product was isolated as a hazy golden liquid (301 parts).

TABLE 1

| Example | Experimental Procedure | Polymer Chain Intermediate | Amine | Physical Form | Acid Value mg KOH/g | Base Equivalent |
|---|---|---|---|---|---|---|
| 7 | 3 | 1 (1230 g) | Dmadmpol (103.5 g) | Golden liquid | 3.8 | 2155 |
| 8 | 3 | 4 (1000 g) | Dmadmpol (82.5 g) | Golden liquid | 31 | 1874 |
| 9 | 3 | 4 (1000 g) | Dmadmpol (165 g) | Golden liquid | 2.7 | 1168 |
| 10 | 3 | 3 (1001 g) | Dmadmpol (38.9 g) | Golden liquid | 15.7 | 4060 |
| 11 | 3 | 3 (1001 g) | Dmadmpol (77.8 g) | Golden liquid | 4.6 | 2331 |
| 12 | 3 | 2 (1000 g) | Dmadmpol (85.8 g) | Golden liquid | 33.4 | 1710 |
| 13 | 3 | 2 (1100 g) | Dmadmpol (188.7 g) | Golden liquid | 5.2 | 1031 |

TABLE 2

| Example | Experimental Procedure | Amine Intermediate Example | Quaternising Agent | Physical Form |
|---|---|---|---|---|
| 14 | 4 | 7 (500 g) | DMS (26.3 g) | Golden liquid |
| 15 | 4 | 8 (1045 g) | DMS (66.4 g) | Golden liquid |
| 16 | 4 | 9 (1113 g) | DMS (115.3 g) | Golden liquid |
| 17 | 4 | 10 (1028 g) | DMS (32.5 g) | Golden liquid |
| 18 | 4 | 11 (1046 g) | DMS (52.8 g) | Golden liquid |
| 19 | 4 | 12 (1063 g) | DMS (72 g) | Beige Paste |
| 20 | 4 | 13 (1239 g) | DMS (139.9 g) | Beige Paste |

Testing of Samples

Amine Degradation Test 0.5 g samples of each dispersant were stored separately in sealed 8 oz jars and heated to 150° C. for 16 hours. Gas Chromatographic analysis of the head space of each jar was performed to detect the presence of trimethylamine.

TABLE 3

| Example | Prep Example | Trimethylamine Present |
|---|---|---|
| 21 | 3 | Yes |
| 22 | 7 | Yes |
| 23 | 8 | Yes |
| 24 | 9 | Yes |
| 25 | 10 | Yes |
| 26 | 11 | Yes |
| 27 | 12 | Yes |
| 28 | 13 | Yes |
| 29 | Comp A | Yes |
| 30 | Comp B | Yes |
| 31 | 4 | No |
| 32 | 14 | No |
| 33 | 15 | No |
| 34 | 16 | No |
| 35 | 17 | No |
| 36 | 18 | No |
| 37 | 19 | No |
| 38 | 20 | No |
| 39 | Comp C | Yes |
| 40 | Comp D | Yes |

Comp A

Comp A is Example 1 of U.S. Pat. No. 3,996,059.

Comp B

Comp B is Example 12 of U.S. Pat. No. 3,996,059.

Comp C

Comp C is Example 2 of U.S. Pat. No. 3,996,059.

Comp D

Comp D is the quaternary ammonium methylsulphate salt of Example 12 of U.S. Pat. No. 3,996,059 as prepared by the process mentioned for Example 2 of the same patent.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits, set forth herein, may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a dispersed particulate solid in a continuous media, and a dispersant of the formula $$(D)_m[-Z-A-R]_n \quad \text{Formula 1}$$

wherein m=1-3 and n=1-2;

wherein Z-A-R is not a polymeric repeat unit attached to itself;

D comprises a $C_{8-50}$ fatty acid; a $C_{8-50}$ alk(en)yl substituted succinic acid, anhydride or partial ester; a dimer or trimer fatty acid; and/or a polymer linear or branched or optionally a block or random copolymer which contains one, two or three groups along the polymer backbone capable of forming a covalent bond with a nitrogen atom of a diamine or an oxygen atom of aminoalcohol;

Z is —O— or —N(T)-;

T is H, or a $C_{1-18}$ hydrocarbyl radical, or a group represented by A-R, or a second polymer D connected to the nitrogen atom via a covalent linkage or to the same polymer D by an acylating group forming a 5-membered cyclic imide ring system;

Z-A-R represents the coupling reaction product of an amino alcohol or a diamine, optionally a triamine, of the formula H-Z-A-R with the reactive group of D; in the case of the diamine or triamine one or more of amine groups can be tertiary, and subsequently said tertiary amine group can be partially or completely quaternised, wherein the coupling reactions between D and Z are a) Michael addition reaction of an activated carbon to carbon double bond of D to an amine precursor to Z, b) amide forming reaction of a carbonyl of D to a nitrogen atom of an primary or secondary amine, c) coupling reaction of an aldehyde or ketone carbon atom of D with an primary or secondary amine nitrogen, d) urea coupling reaction from an isocyanate group of D with an diamine precursor group to Z-A-R, e) reaction of isocyanate group of D with alcohol to form urethane linkage, f) polymerization of ether repeating units from an amine precursor to Z-A-R, g) polymerization of ether repeating units from an oxygen of a hydroxyl precursor to Z-A-R, or h) ester forming reaction of an carbonyl group of the precursor of D with an oxygen atom of the alcohol precursor of Z-A-R;

A is represented by the formula

—CH$_2$—C(T$^2$)(T$^3$)-CH(T$^5$)- wherein $T^2$ and $T^3$ are each independently alkyl CH$_2$OT$^4$, aryl or the group —CH(T$^6$)-R;

$T^4$ is H, the polymer D or mixtures thereof;

$T^5$ and $T^6$ are each independently H or optionally $C_{1-4}$ alkyl, halo, $C_{1-4}$ alkyl ether, or substituted aryl; and R is a tertiary amine group including salts thereof represented by the formula

—N(R$^2$)(R$^3$)

or a quaternary ammonium group represented by the formula

—N$^+$(R$^2$)(R$^3$)(R$^4$)W$^-$ or mixtures thereof, wherein $R^2$, $R^3$ and $R^4$ are each independently a linear or branched alkyl, aryl or alkaryl groups; and $W^-$ is a colorless or colored anion;

wherein the continuous media is an aqueous media and D is a polymer containing repeating units from a polyether.

2. The composition of claim 1, wherein the composition is a millbase, toner, ink, or coating composition.

3. The composition of claim 1, wherein the composition imparts selected colors to a flat panel display device using color filter technology.

4. The composition of claim 1, wherein the composition is a molded or extruded plastic composition.

5. The composition of claim 1, wherein the particulate solid is a pigment or a filler.

6. A paint or ink comprising a particulate solid, a continuous medium, and a dispersant compound obtained/obtainable by reacting groups on a component D, capable of forming a covalent chemical bond with a nitrogen or oxygen atom, with an oxygen of an amino alcohol or an amine of a diamine or triamine of the formula H-Z-A-R wherein Z is —O— or —N(T)-;

T is H, or a $C_{1-18}$ hydrocarbyl radical, or a group represented by A-R, or a second polymer D connected to the nitrogen atom via a covalent linkage or to the same polymer D by an acylating group forming a 5-membered cyclic imide ring system;

D comprises a $C_{8-50}$ fatty acid; a $C_{8-50}$alk(en)yl substituted succinic acid, anhydride or partial ester; a dimer or trimer fatty acid; and/or a polymer linear or branched or optionally a block or random copolymer which contains one, two or three groups along the polymer backbone capable of forming a covalent bond with a nitrogen atom of a diamine or an oxygen atom of amino alcohol;

A is represented by the formula $-CH_2-C(T^2)(T^3)-CH(T^5)-$ wherein
- $T^2$ and $T^3$ are each independently alkyl $CH_2OT^4$, aryl or the group $-CH(T^6)-R$;
- $T^4$ is H, the polymer D or mixtures thereof;
- $T^5$ and $T^6$ are each independently H or optionally $C_{1-4}$ alkyl, halo, $C_{1-4}$ alkyl ether, or substituted aryl; and
- R is a tertiary amine including salts thereof of the formula $-N(R^2)(R^3)$ or a quaternary ammonium group represented by the formula $-N^+(R^2)(R^3)(R^4)W^-$ or mixtures thereof, wherein
- $R^2$, $R^3$ and $R^4$ are each independently a linear or branched alkyl, aryl or alkaryl groups; and
- $W^-$ is a colorless or colored anion;

wherein the continuous media is an aqueous media and D is a polymer containing repeating units from a polyether.

* * * * *